United States Patent
Wiehen

(10) Patent No.: US 11,479,221 B2
(45) Date of Patent: Oct. 25, 2022

(54) METHOD FOR ESTIMATING THE ACHIEVABLE TOTAL BRAKING FORCES FOR THE AUTOMATED DECELERATION OF A UTILITY VEHICLE, BRAKING SYSTEM AND UTILITY VEHICLE HAVING SAID BRAKING SYSTEM

(71) Applicant: WABCO GmbH, Hannover (DE)

(72) Inventor: Christian Wiehen, Burgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 126 days.

(21) Appl. No.: 16/611,231

(22) PCT Filed: Apr. 13, 2018

(86) PCT No.: PCT/EP2018/059507
§ 371 (c)(1),
(2) Date: Nov. 6, 2019

(87) PCT Pub. No.: WO2018/215135
PCT Pub. Date: Nov. 29, 2018

(65) Prior Publication Data
US 2020/0156602 A1   May 21, 2020

(30) Foreign Application Priority Data
May 20, 2017   (DE) .................... 10 2017 004 885.1

(51) Int. Cl.
*B60T 8/172* (2006.01)
*B60T 7/12* (2006.01)
*B60T 8/17* (2006.01)

(52) U.S. Cl.
CPC ............... *B60T 8/172* (2013.01); *B60T 7/12* (2013.01); *B60T 8/1708* (2013.01)

(58) Field of Classification Search
CPC .......... B60T 8/172; B60T 7/12; B60T 8/1708; B60T 2250/02
See application file for complete search history.

(56) References Cited

U.S. PATENT DOCUMENTS 5,344,222 A    9/1994   Helldoerfer et al.
5,415,466 A *  5/1995   Breen ........................ B60T 7/20
                                                      188/181 T (Continued)

FOREIGN PATENT DOCUMENTS

DE    3909588 A1   9/1990
DE    4210576 C1   8/1993
(Continued)

*Primary Examiner* — Aniss Chad
*Assistant Examiner* — Madison R Hughes
(74) *Attorney, Agent, or Firm* — Leydig, Voit & Mayer, Ltd.

(57) ABSTRACT

A method for estimating achievable total braking force for an automated deceleration of a vehicle or vehicle combination includes performing, for each respective one of a plurality of brake units, at least partially applying, in an estimation braking operation by the respective brake unit, an estimation braking force configured to cause deceleration and determining, from measured values, a current deceleration caused by the estimation braking force. The method further includes, for each respective brake unit, determining, a respective braking characteristic value of the respective brake unit, the braking characteristic value representing a ratio between a partial braking force of the respective brake unit and a manipulated variable which is set for the partial braking force of the respective brake unit, and determining a respective achievable partial braking force. The method further includes estimating, as a sum of the respective achievable partial braking forces, the achievable total braking force.

17 Claims, 3 Drawing Sheets

(56) References Cited

U.S. PATENT DOCUMENTS

| | | | | |
|---|---|---|---|---|
| 5,669,678 A | * | 9/1997 | Stumpe | B60T 8/00 303/113.4 |
| 6,312,065 B1 | * | 11/2001 | Freitag | B60T 7/122 303/186 |
| 7,206,702 B2 | * | 4/2007 | Isono | B60T 8/172 702/41 |
| 2005/0057096 A1 | * | 3/2005 | Kudo | B60T 8/4872 303/155 |

FOREIGN PATENT DOCUMENTS

| | | |
|---|---|---|
| DE | 4310422 A1 | 7/1994 |
| DE | 19517708 A1 | 11/1996 |
| DE | 102008061944 A1 | 6/2010 |
| WO | WO 03011669 A1 | 2/2003 |

* cited by examiner

METHOD FOR ESTIMATING THE ACHIEVABLE TOTAL BRAKING FORCES FOR THE AUTOMATED DECELERATION OF A UTILITY VEHICLE, BRAKING SYSTEM AND UTILITY VEHICLE HAVING SAID BRAKING SYSTEM

CROSS REFERENCE TO RELATED APPLICATIONS

This application is a U.S. National Phase Application under 35 U.S.C. § 371 of International Application No. PCT/EP2018/059507, filed on Apr. 13, 2018, and claims benefit to German Patent Application No. DE 10 2017 004 885.1, filed on May 20, 2017. The International Application was published in German on Nov. 29, 2018 as WO 2018/215135 under PCT Article 21(2).

FIELD

The invention relates to a method for estimating the achievable total braking forces for the automated deceleration of a utility vehicle or of a vehicle combination having a plurality of axles to a brake system for carrying out such a method, and to a utility vehicle or a vehicle combination having such a brake system.

BACKGROUND

In modern utility vehicles, increasingly automated brake systems are being used, these being for example advanced emergency brake systems (AEBS) and driver assistance systems such as electronic stability controllers (ESC), wherein the brake system decelerates the vehicle in an automated fashion as required by means of an electronic brake control unit, independently of driver braking operations. The most accurate possible knowledge of the available total braking force of the utility vehicle is of particular significance here. This applies to a particular degree to what is referred to as platooning, wherein a plurality of utility vehicles or vehicle combinations in road traffic drive one behind the other at the shortest possible distance using a coordinating controller, in order to reduce the fuel consumption. The utility vehicles of the platoon are networked to one another or have devices for distance measurement such as RADAR or LIDAR, which serve to set the shortest possible distances from the vehicle traveling ahead without road safety being adversely affected. Owing to the short reaction times of the automated deceleration, the networked utility vehicles in the platoon require a significantly shorter distance than in the case of manual vehicle guidance, as a result of which the air resistance is considerably reduced.

However, in order to keep the distance as short as possible, the most precise possible knowledge of the minimum required safety distance is necessary, which distance depends decisively on the maximum available braking force of a utility vehicle or of a vehicle combination in the platoon. The achievable total braking forces of a utility vehicle or of a vehicle combination depend on a multiplicity of factors, in particular the braking characteristic value of the wheel brakes, which represents the dependence of the braking torque applied by the wheel brake on the applied brake pressure. In addition to this braking characteristic value, structurally conditioned properties of individual brakes and also tires as well as the coefficient of friction of the roadway also influence the achievable braking forces.

DE 10 2008 061 944 A1 discloses a method for determining precise braking characteristic values which are used to determine the respective response pressure of a brake. The intention is to use the braking characteristic values to reduce the regulation expenditure for correcting the applied brake pressure at a respective brake. In the known method, after a braking request has been sensed the brake pressure at the brakes of a first axle is changed, while the brake pressure at all the brakes of the other axles is kept constant, or no brake pressure is applied. Furthermore, a motion characteristic value, which indicates a deceleration of a tractor vehicle or of a vehicle train, is acquired. A braking characteristic value is calculated from the motion characteristic value and the brake pressure of the brakes of the first axle, if appropriate taking into account the current brake temperature.

SUMMARY

In an embodiment, the present invention provides a method for estimating achievable total braking force for an automated deceleration of a utility vehicle or of a vehicle combination having a plurality of axles. Partial braking forces are set at each of a plurality of wheel brakes according to a manipulated variable. The method includes performing, for each respective one of a plurality of brake units: at least partially applying, in an estimation braking operation by the respective brake unit, the respective brake unit being composed of at least one of the plurality of wheel brakes an estimation braking force configured to cause deceleration, determining, from measured values, a current deceleration caused by the estimation braking force, determining, by taking into account the current deceleration caused by the estimation braking force and a determined or specified total mass of the utility vehicle or of the vehicle combination, a respective braking characteristic value of the respective brake unit, the braking characteristic value representing a ratio between a partial braking force of the respective brake unit and a manipulated variable which is set for the partial braking force of the respective brake unit, and determining a respective achievable partial braking force that can be achieved by the respective brake unit from the determined respective braking characteristic value. The method further includes estimating, as a sum of the respective achievable partial braking forces, the achievable total braking force.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
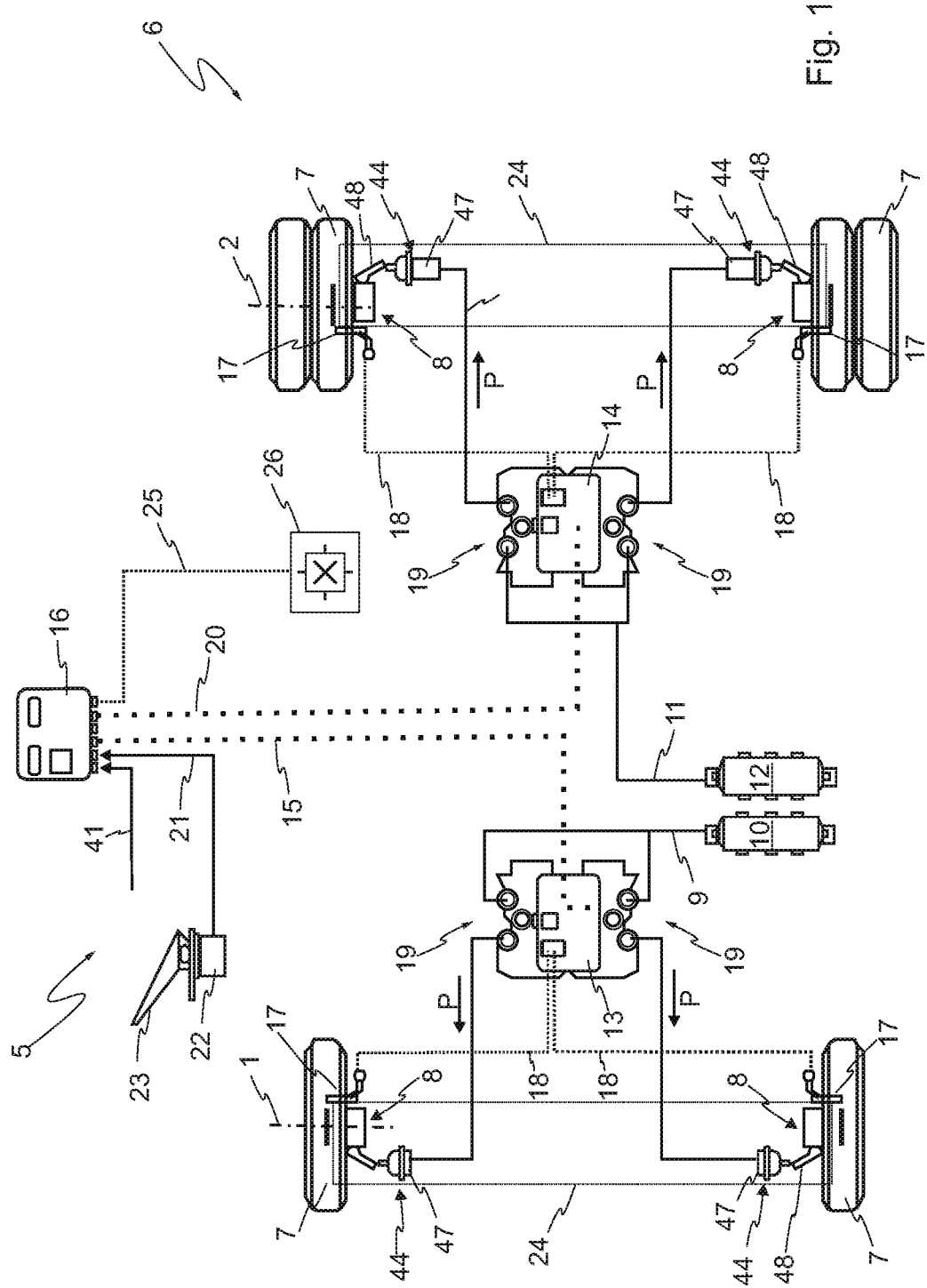
FIG. 1 shows a pneumatic and electrical diagram of a brake system of a utility vehicle according to a first exemplary embodiment with a pneumatic activation system.

The recording of achieved braking forces during the travel of a utility vehicle generally does not provide any reliable information about the maximum deceleration since this would require the execution of a full braking process.

Although measurement of the currently achievable total braking forces could basically be determined by means of braking tests, the expenditure on measuring the achievable total forces is large and will frequently have to be implemented, for example, after each change in the loading state of the utility vehicle or vehicle combination. Since this is hardly practical, the achievable total braking forces, in particular the maximum achievable braking force of the utility vehicle or of a vehicle combination, remain unknown. The potential for platooning in order to reduce the fuel consumption cannot be fully utilized without reliable information on the achievable total braking forces.

The present invention provides for accurately estimating the achievable total forces for decelerating a utility vehicle or a vehicle combination with a plurality of axles during ongoing operation.

According to the invention, braking characteristic values can be determined as a ratio between the partial braking force and the brake pressure which is set for it in estimation braking operations for individual brake units which are composed of at least one of the wheel brakes, taking into account the current deceleration, achieved in this context, of the vehicle or of the vehicle combination in the way described below. A utility vehicle can be understood here to be a motor vehicle which, depending on its design, is intended for transporting goods (for example trucks, tractor vehicles or the like) or for transporting persons (for example buses) or else for towing trailers. A vehicle combination comprises a motorized tractor vehicle and at least one trailer vehicle.

The braking characteristic values can advantageously be determined for brake units with wheel brakes of individual axles or groups of axles so that stable braking conditions are present during the estimation braking operation. If the stability of the utility vehicle or of the vehicle combination is not at risk in a specific braking situation, in one embodiment of the invention it is also possible to evaluate individual wheel brakes as a brake unit according to the invention, or a braking characteristic value can be estimated for an active wheel brake and the total forces which can be achieved with this wheel brake. The wheel brakes of groups of axles are evaluated as brake units according to the invention, in particular in embodiments in which the wheel brakes of a plurality of axles are actuated in a common brake circuit, for example by means of the same pressure modulator. The current deceleration is determined from measured values, for example from the measured values of an acceleration sensor. The acceleration sensor is assigned here to the brake control unit in such a way that the brake control unit has access to the measured values of the acceleration sensor or receives already evaluated information with respect to the current deceleration. In one embodiment of the invention, measured values of the acceleration sensor of a sensor module are used for the stability control of the vehicle.

In one advantageous embodiment, the current deceleration is derived from the measured values of the rotational speed sensors of the wheels so that recourse is made to existing sensor hardware of the brake system.

Estimation braking operations are deceleration processors with implementation of a braking force which is requested to decelerate the utility vehicle, in which forces the requested braking force is at least partially applied by a brake unit which is the only active one in this case. An electronic control unit of the brake system is configured and embodied here in such a way that in order to carry out the estimation braking operations individual brake units, that is to say preferably the wheel brakes of individual axles or groups of axles, can be actuated separately, that is to say can be actuated in order to implement the braking force request independently of the other brake units. The invention is based here on the realization that for safety reasons the performance of the entire brake system cannot be registered at relatively high brake pressures but instead when estimation braking operations are carried out with just one active brake unit this brake unit operates, for the implementation of the braking force request, at an operating point with relatively high brake pressure and therefore estimation, that is to say an approximate determination, of the partial braking force of this brake unit is possible with common activation of a plurality of wheel brakes. Specifically, with an estimation of the respective partial braking forces it is possible to draw conclusions about the common performance of the brake units even for relatively high braking requests.

In order to determine the achievable partial braking forces of a brake unit, embodiments of the invention can initially assume that the braking torque of a wheel brake basically behaved in proportion with the current value of the manipulated variable which is set in order to activate the wheel brake, for example the current brake pressure. The proportion is decisively influenced by a braking characteristic value which represents the ratio between the partial braking force and the manipulated variable which is set for it.

The wheel brakes are advantageously activated pneumatically or hydraulically, wherein the brake pressure is the manipulated variable. Correspondingly, the braking characteristic value of the wheel brake characterizes the ratio of the braking torque, generated by the wheel brake, with respect to the brake pressure which is applied for the purpose of activation. With hydraulic activation of the wheel brakes it is possible to set high braking torques and braking forces with a high setting accuracy. In a further advantageous embodiment, electromechanical wheel brakes are provided. In the preferred embodiment, the wheel brakes are put into operation by means of a pneumatic activation system, wherein non-powered pressure behavior with a constant force is possible and relatively small leaks do not cause environmental damage. In addition, pneumatic brake systems are built up in a comparatively easy way and in addition are generally more cost-effective than comparable electromechanical brake systems.

During the estimation of the available braking forces according to embodiments of the invention, in order to determine the braking characteristic value a respective design factor, which represents the design-conditioned characteristic of the respective wheel brakes, for example the lever ratios, is also advantageously taken into account. This design factor does not change with the operation of the brake system and is determined in advance and specified to the estimation according to the invention. Therefore the following relationship is obtained for the braking torque at the wheel brake:

$$M_B = P \times C_{des} \times C_L.$$

where: $M_B$ denotes the braking torque, P denotes the brake pressure (manipulated variable), $C_D$ denotes the design factor, and $C_L$ denotes the braking characteristic value.

According to embodiments of the invention, the braking characteristic value, which represents the ratio between the partial braking force and the manipulated variable (such as brake pressure) which is set for it, can alternatively be determined. Embodiments of the invention further provide for the achievable partial braking forces to be determined from the braking characteristic value which can be determined in this way. The determination of the achievable partial braking forces occurs here in respective estimation braking operations so that by forming the sum of the achievable partial braking forces it is possible to estimate total braking forces of all the wheel brakes, but without having to activate them jointly for the estimation.

According to the invention, the braking characteristic value can be determined taking into account the current deceleration and a determined or predefined total mass of the utility vehicle or of the vehicle combination. By taking into account the equivalence of the braking torque and the product of the braking torque and dynamic rolling radius ($F_B = M_B/r_{dyn}$) it is possible to determine the braking characteristic value of the active brake unit according to the following equation:

$$C_L = b \times m_{tot} \times r_{dyn}/P \times c_d$$

In this equation, b denotes the current deceleration, $m_{tot}$ denotes the total mass of the vehicle or of the vehicle combination, and $r_{dyn}$ denotes the dynamic rolling radius.

From the braking characteristic value ($C_{L1}$, $C_{L2}$, $C_{L3}$, $C_{L4}$) which is determined in this way, a conclusion can be, according to embodiment of the invention, drawn about the partial braking forces ($F_{B1}$, $F_{B2}$, $F_{B3}$, $F_{B4}$) which can be achieved by the respective brake unit (24), according to the following relationship:

$$F_{B,n} = P \times C_{D,n} \times C_{L,n}/r_{dyn,n}.$$

Here, $F_B$ denotes the achievable partial braking force and n denotes the serial number of a brake unit.

Taking into account the determined braking characteristic values it is therefore possible to determine the achievable partial braking force of each brake unit in accordance with the brake pressure, that is to say estimate the achievable partial braking force for each possible level of the brake pressure between a minimum and a maximum. Precise estimation of the achievable partial braking forces of a brake unit which is active during the estimation braking is possible if the current total mass of the vehicle or the vehicle combination, measured during the ongoing operation, is taken into account. As a result, different loading states and therefore different axle loads are taken into account during the estimation of the achievable total braking forces for the automatic deceleration of the utility vehicle or of the vehicle combination.

The accuracy of the estimation of the achievable total braking forces is improved further if design factors are determined in advance for the respective brake units and specified in the estimation of the achievable partial braking forces.

In one advantageous embodiment of the invention, an estimation braking operation is omitted or aborted when there are requests for greater braking forces than a previously determined achievable partial braking force for the active brake unit, so that it is ensured in every case that the requested braking force is available. Omission or aborting of an estimation braking operation advantageously occurs in accordance with consideration of the current wheel slip at the active brake unit, wherein a threshold value for the wheel slip, for example seven percent, is specified as a criterion for the execution of estimation braking operations. If the wheel slip exceeds the specified threshold value, the entire available brake system is used to decelerate the utility vehicle or the vehicle combination and it ensures that stability measures can be taken, for example an anti-lock brake system can engage.

In order to ensure that the total braking force can be increased as quickly as possible when necessary during the estimation braking operations, the application pressure is set for one of the brake units at the other wheel brakes during the estimation braking operation.

The estimation braking operations are carried out successively for all the brake units and repeated so that current braking characteristic values and estimated partial braking forces are always available for the respective brake units so that the achievable braking forces, in particular the achievable maximum braking force, can always be estimated. The repetition of the estimation braking operations at individual brake units advantageously occurs according to a specified repetition pattern, for example periodically with respect to a sequence of the brake units. During this successive execution of the estimation braking operations for all the brake units it is possible to carry out a plurality of estimation braking operations in succession during the implementation of a braking request, that is to say during a deceleration process. If the active brake unit reaches the desired operating point during an estimation braking operation, the braking characteristic values are determined according to the invention for the brake pressure which is present then as well as the deceleration of the vehicle or of the vehicle combination which is measured and determined then, and the partial braking force is estimated. The further implementation of the braking force request then occurs by means of a further brake unit which is activated alone for this purpose and is actuated by the brake control unit.

FIG. 1 shows an electrical-pneumatic diagram of an electronic brake system 5 of a utility vehicle 6. Electrical leads are represented by dotted lines and pneumatic lines are represented by solid lines. In the exemplary embodiment shown, the utility vehicle 6 comprises two axles 1, 2, on each of which wheels 7 are arranged on both sides. In order to brake the utility vehicle 6, a wheel brake 8 is assigned to each wheel 7. In the exemplary embodiment shown, the wheel brakes 8 are embodied as disk brakes and are put in operation by means of an activation system 44, 45, 46. In the exemplary embodiment according to FIG. 1, the brake system 5 has a pneumatic activation system 44, so that the wheel brakes 8 can be activated pneumatically and apply a braking force to the rotating wheel 7 in accordance with the applied brake pressure P. The pneumatic activation system 44 is composed of a pneumatic brake cylinder 47 which is connected to the wheel brake 8, and the brake lever 48 and a pressure piston which is arranged in the interior of the wheel brake 8. The brake cylinder 47 generates an activation force under the effect of the manipulated variable applied via the pneumatic line 49, specifically the brake pressure P. The brake lever 48 serves to transmit and amplify the activation force generated by the brake cylinder 47.

Figure 2:
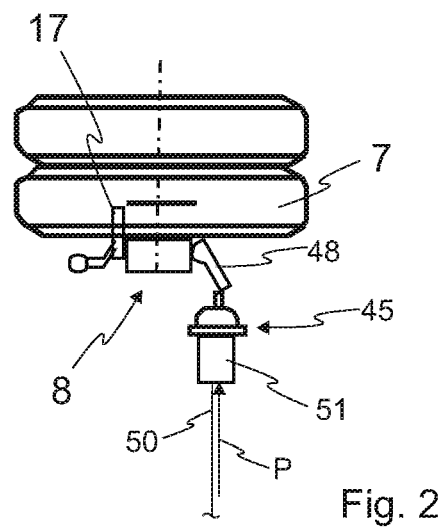
FIG. 2 shows a schematic view of a second exemplary embodiment with a hydraulic activation system.

In a second exemplary embodiment, a hydraulic activation system 45 is provided which is shown in principle in FIG. 2. In this context, a brake pressure P is connected via a hydraulic line 50 to a hydraulic cylinder 51 which hydraulically generates an activation force corresponding to the brake pressure P.

Figure 3:
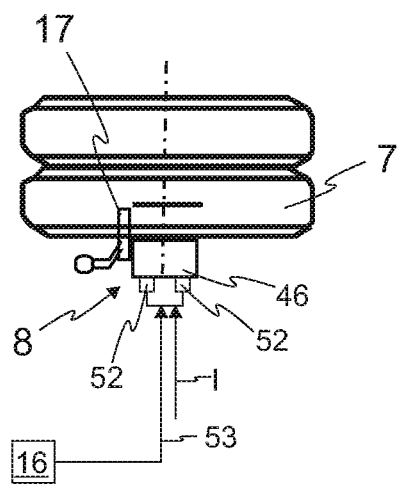
FIG. 3 shows a schematic view of a second exemplary embodiment with a hydraulic activation system.

In a third exemplary embodiment according to FIG. 3, an electromechanical activation system 46 is provided. The activation system 46 comprises one or more electromechanical actuators 52 which replace the brake piston of a brake cylinder. The brake linings are pressed by the actuators 52, specifically against the brake disk in the case of the disk brake, in accordance with the electrical manipulated variable I which is applied via the control line 53. In the exemplary embodiment according to FIG. 1, the manipulated variable I is determined by the brake control unit 16 in a way analogous to the determination of the brake pressure as a manipulated variable in the case of pneumatic activation.

In the exemplary embodiment shown, the brake system 5 has two brake circuits, wherein a first brake circuit 9 is assigned to the axle 1 located at the front in the direction of travel, and a second brake circuit 11 with a second pressure medium reservoir 12 is assigned to the rear axle 2. In order to pneumatically activate the wheel brakes 8, a first pressure medium reservoir 10 is arranged in the first brake circuit 9, and a second pressure medium reservoir 12 is arranged in the second brake circuit 11. In the exemplary embodiment shown, an axle modulator 13, 14 is arranged in each of the two brake circuits in order to set the brake pressure at the wheel brakes 8. A front axle modulator 13 is connected here to a brake control unit 16 via a signal line 15. The signal line 15 is, in particular, a CAN connection. The rear axle modulator 14 is connected to the brake control unit 16 via a signal line 20 (CAN bus).

Rotational speed sensors 17 are arranged at each of the wheels 7. The rotational speed sensors 17 of the wheels 7 of the front axle 1 are connected to the front axle modulator 13 via an electrical line 18 in a signal-transmitting fashion. Correspondingly, the rotational speed sensors 17 of the wheels 7 of the rear axle 2 are connected to the rear axle modulator 14. When the brake system 5 is operating, the axle modulators 13, 14 acquire the measured values for the rotational speeds of the respective wheels and transmit them, if appropriate after evaluation by an electronic system, to the brake control unit 16. The brake control unit 16 evaluates the determined rotational speeds and, if appropriate, adapts the brake pressure which is specified to the respective axle modulator 13, 14.

By evaluating the rotational speed measured values, the brake control unit 16 infers the tendency of the respective wheel 5 to block. If the applied braking force exceeds the maximum transmissible braking force at one or more wheels 7, they begin to block, as a result of which the utility vehicle 6 can become unstable. Accordingly, an anti-lock brake function of the brake control unit 16 monitors the tendency of each wheel 7 to block by means of the rotational speed sensors 17.

In the exemplary embodiment shown, the axle modulators 13, 14 each have two pneumatically independent pressure control circuits which each have a valve arrangement 19 and comprise an inlet valve and an outlet valve. When there is a tendency to block or spin, the respective axle modulator 13, 14 modifies the brake pressure, requested by the brake control unit 16, for the respective axle 1, 2.

The brake control unit 16 determines the brake pressures P which are to act on the wheel brakes 8 at the respective activation systems 44, in accordance with a braking force which is requested in each case for the deceleration of the utility vehicle 6, that is to say a braking force request 21, 41. In order to receive braking force requests 21, the brake control unit 16 is connected to the brake signal encoder 22 to which a brake pedal 23 is coupled. The brake pedal 23 is arranged in the driver's cab of the utility vehicle 6. When the brake pedal 23 is activated, the brake signal encoder 22 sends the brake control unit 17 a braking force request 21 which corresponds qualitatively to the driver's braking request. The brake control unit 16 is also designed to receive external braking force requests 41, for example from the driver assistance systems. In particular in the case of platooning, when a plurality of utility vehicles or vehicle combinations are networked to one another, the brake control unit 16 receives external braking force requests 41 for automatic deceleration.

In order to keep the distance from the vehicle traveling ahead as short as possible in the case of platooning, the achievable total forces for the automated deceleration are estimated for the vehicle or the vehicle combination, which is explained in more detail below with reference to FIG. 1 and FIG. 5. In order to estimate the total forces which can be achieved by the brake system 5, during ongoing operation estimation braking operations are carried out in which brake units 24 composed of in each case at least one of the wheel brakes 8 apply at least partially alone, each as the only active brake unit 24, the braking force which is requested for deceleration. In the exemplary embodiment shown, brake units 24 are used with in each case both wheel brakes 8 of one axle as an active brake unit 24 in estimation braking operations for implementing the braking force request 2, 41 by the brake control unit 16. Insofar as the stability of the vehicle is not in question, individual wheel brakes may also be used for the purpose of estimation braking operations as the only active brake unit so that only one wheel brake 8 applies braking forces. In the exemplary embodiments in which a plurality of axles are assigned to a common brake circuit, estimation braking operations are carried out for brake units with the wheel brakes 8 of a plurality of axles of the common brake circuit.

During the estimation braking operations, the current deceleration of the utility vehicle 6 or the vehicle combination 27 is determined from measured values 25. For this, the brake unit 16 is assigned an acceleration sensor 26. Alternatively, the brake control unit 16 determines the current deceleration from the rotational speed measured values of the rotational speed sensors 17.

The method according to the invention for estimating the achievable total braking forces is explained below on the basis of an exemplary embodiment of a vehicle combination 27 according to FIG. 4, which vehicle combination is composed of a utility vehicle 6 with two axles 1, 2 and a trailer vehicle 28, likewise with two axles 3, 4. The vehicle combination 27 therefore comprises four axles 1, 2, 3, 4, which can each apply partial braking forces $F_{B1}$, $F_{B2}$, $F_{B3}$, $F_{B4}$. The total mass $m_{tot}$ is dependent here on the loading state of the vehicle combination 27 divided into axle loads ($m_1$, $m_2$, $m_3$, $m_4$). The respective partial braking force $F_{B1}$, $F_{B2}$, $F_{B3}$, $F_{B4}$ can be described as a quotient of the respectively acting braking torque $M_B$ and the respective dynamic rolling radius $r_{dyn}$, in accordance with the formula $$F_B = M_B / r_{dyn}.$$

The braking torque is proportional here to the respectively applied brake pressure.

In order to estimate the total braking forces $F_{Ges}$ which can be achieved for the automatic deceleration (FIG. 5), estimation braking operations 29 in which in each case the achievable partial braking force is estimated for the respective brake unit 24 are carried out for individual brake units. The achievable partial braking forces are determined in separate estimation braking operations 29 and compiled in a braking force table 30, wherein the sum 31 of the currently achievable partial braking forces is adopted as an achievable total braking force $F_{Ges}$. The estimation braking operations are carried out continuously in succession and repeated cyclically, so that current values for the achievable partial braking forces are always available in the brake force table 30.

Figure 5:
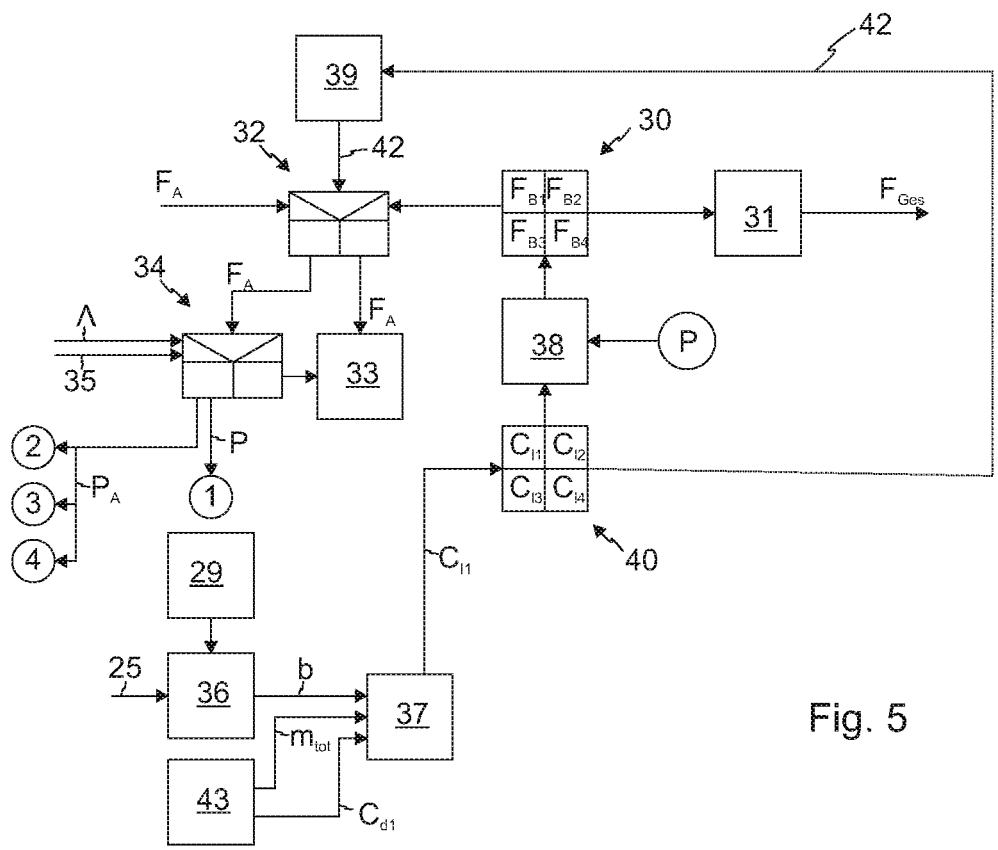
FIG. 5 shows a flow diagram of an exemplary embodiment of a method for estimating the achievable total braking forces in a vehicle combination according to FIG. 4.

As FIG. 5 shows, in a first step a selection 39 is made of a brake unit for which the next estimation braking operation 29 is to be carried out. The selection 39 is made according to a cyclically repeated sequence 42, so that after the conclusion of an estimation braking operation for a further axle an estimation braking operation 29 is carried out. In the exemplary embodiment according to FIG. 5, the front axle 1 of the utility vehicle 6 is selected so that during the estimation braking operation 29 the requested braking force $F_A$ is implemented solely by means of the active brake unit with the wheel brakes of the axle 1. While the brake pressure P which is suitable for implementing the braking request acts on the brake unit, which is selected for the estimation braking operation 29, of the axle 1 application pressure $P_A$ is set at the activation systems 44, 45 of the other wheel brakes 8 of the axles 2, 3, 4.

An estimation braking operation 29 is omitted or aborted when higher braking forces are requested than a previously determined achievable partial braking force for the active brake unit. This is represented in the diagram according to FIG. 5 by a comparison step 32 in which the requested braking force $F_A$ is carried out with the value last stored in the braking force table 30, for the achievable partial braking force $F_{B1}$ for the brake unit of the axle 1. If the requested braking force $F_A$ cannot be achieved for the active brake unit, a normal braking operation 33 takes place with a plurality of wheel brakes, in particular by means of all the wheel brakes of the brake system. In addition, the execution of the estimation braking operation 29 in the exemplary embodiments shown is dependent on an assessment 34 of the wheel slip λ of the active brake unit. If the current wheel slip λ exceeds a predefined threshold value 35 of, for example, seven percent, the provided estimation braking operation 29 is omitted or aborted and the requested braking force $F_A$ is implemented by all the brake units (normal braking operation 33).

During the estimation braking 29, the wheel brakes of the active brake unit reach a high operating point by only implementing the requested braking force. At the specific operating point with a known brake pressure P, a determination process 36 of the current deceleration b takes place on the basis of the current measured value 25. Given knowledge of the currently present deceleration and of the corresponding brake pressure which is set, there is a determination process 37 of the braking characteristic value $C_{L1}$ which represents the ratio between the (searched-for) partial braking force $F_{B1}$, $F_{B2}$, $F_{B3}$, $F_{B4}$ and the brake pressure P which is set for it. Since the braking torque is proportional to the applied braking pressure, a conclusion can be drawn about the proportionality factor in the ratio between the braking torque and brake pressure by taking into account the current deceleration b. The proportionality is determined here essentially by the braking characteristic value $C_{L1}$. This braking characteristic value $C_{L1}$ is alternatively determined by taking into account the current deceleration b and a determined or predefined total mass $m_{tot}$ of the utility vehicle or of the vehicle combination. The total mass $m_{tot}$ is made available by means of corresponding measured values.

The braking characteristic value for the brake unit of the front axle 1 of the tractor vehicle is therefore determined according to the following formula:

$$C_{L1} = v \times m_{tot} \times r_{dyn}/p \times c_{D1}.$$

In the abovementioned relationship, only the braking characteristic value $C_{L1}$ which represents the performance of the brake unit is variable. The design factor $C_{D1}$ is geometrically defined and does not change as the operating time of the vehicle progresses. It is therefore determined in advance and can be predefined to the process of determining the braking characteristic value $C_{L1}$. The determination 37 of the braking characteristic value $c_{L1}$ therefore takes into account predefinitions 43 relating to the current total mass $m_{tot}$ as well as the corresponding design factor $C_{D1}$.

With the braking characteristic value $C_{L1}$ which is currently determined during the estimation braking operation 29, a conclusion 38 is drawn about the achievable partial braking force $F_{B1}$ for each adjustable level of the brake pressure P, according to the following relationship:

$$F_{B1} = P \times C_{D1} \times C_{L1}/r_{dyn,1}$$

In this context, the design factor $C_{D,1}$ of the active brake unit and the dynamic rolling radius $r_{dyn,1}$ thereof are used for the conclusion 38 about the partial braking forces which can be achieved by the active brake unit.

Figure 4:
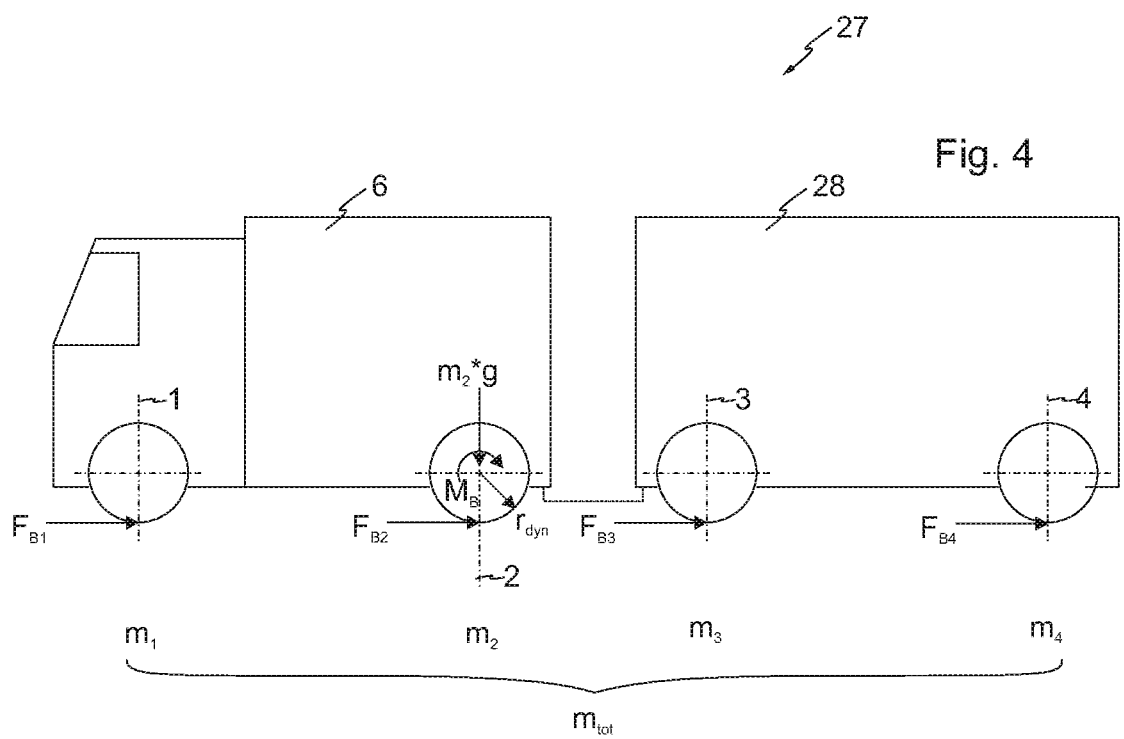
FIG. 4 shows a schematic illustration of the braking forces at a vehicle combination with a plurality of axles.

Accordingly, braking characteristic values $c_{L1}$, $c_{L2}$, $c_{L3}$, $c_{L4}$ for the further brake units are used in successive estimation braking operations 29, that is to say in the exemplary embodiment they are determined on an axle basis for the further axles of the vehicle combination 27 (FIG. 4).

While the vehicle, or the vehicle combination, is operating, the estimation braking operations 29 are carried out successively in a time-discrete fashion, for example in different braking processes. However, even when correspondingly quantitative braking force requests are present, a plurality of estimation braking operations 29 can also additionally occur for different brake units for the implementation of the same braking force request, wherein after the expiry of the estimation braking operation 29 for a first brake unit, subsequently another brake unit alone applies braking force for a further estimation braking operation 29. During the estimation braking operations 29 for one of the brake units, application pressure is set in each case at the other wheel brakes, so that when necessary braking force can be activated quickly, or the braking potential of the entire brake system is available for implementing corresponding braking requests.

In the exemplary embodiment shown, the braking characteristic values $c_{L1}$, $c_{L2}$, $c_{L3}$, $c_{L4}$ which are determined in different estimation braking operations are stored in a characteristic value table 40 and made available for the compilation of the braking force table 30 in which the achievable partial braking forces $F_{B1}$, $F_{B2}$, $F_{B3}$, $F_{B4}$ are compiled in accordance with the brake pressure P. The characteristic value table 40 is continuously updated with ongoing execution of estimation braking operations 29.

In the exemplary embodiment with electromechanical activation, an electrical manipulated variable I (FIG. 3) is used in the described steps instead of the brake pressure P.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1. Axle
2. Axle
3. Axle
4. Axle
5. Brake system
6. Utility vehicle
7. Wheel
8. Wheel brake
9. First brake circuit
10. First pressure medium reservoir
11. Second brake circuit
12. Second pressure medium reservoir
13. Front axle modulator
14. Rear axle modulator
15. Signal line (CAN)
16. Brake control unit
17. Rotational speed sensor
18. Line
19. Valve arrangement
20. Signal line (CAN)
21. Braking force request
22. Brake signal encoder
23. Brake pedal
24. Brake unit
25. Measured value
26. Acceleration sensor
27. Vehicle combination
28. Trailer vehicle
29. Estimation braking operation
30. Braking force table
31. Sum
32. Comparison
33. Normal braking operation
34. Assessment
35. Threshold value
36. Determination
37. Determination
38. Conclusion
39. Selection
40. Characteristic value table
41. External braking force request
42. Sequence
43. Predefinition
44. Activation system (pneumatic)
45. Activation system (hydraulic)
46. Activation system (electromechanical)
47. Pneumatic brake cylinder
48. Brake lever
49. Pneumatic line
50. Hydraulic line
51. Hydraulic cylinder
52. Electromechanical actuator
53. Electrical control line
$F_{B1}$-$F_{B4}$ Partial braking force
$m_{tot}$ Total mass
$m_1$-$m_4$ Axle loads
$\lambda$ Slip
$M_B$ Braking torque
$C_{L1}$-$C_{L4}$ Braking characteristic value
$C_{D1}$ Design factor
$r_{dyn}$ Dynamic rolling radius
P Manipulated variable brake pressure
$P_A$ Application pressure
I Electrical manipulated variable
b Current deceleration
$F_{Ges}$ Total braking force

The invention claimed is:

1. A method for estimating achievable total braking force for an automated deceleration of a utility vehicle or of a vehicle combination having a plurality of axles and a plurality of wheel brakes, the method comprising:
performing, for each respective one of a plurality of brake units, a respective estimation braking operation including:
outputting, by a valve arrangement of the respective brake unit, a respective estimation braking pressure to an activation system of one or more respective wheel brakes of the plurality of wheel brakes included in the respective brake unit so as to apply, by the one or more respective wheel brakes, an estimation braking force, wherein the estimation braking force is applied in the respective estimation braking operation while no braking force is output by any wheel brake, of the utility vehicle or vehicle combination, that is not part of the respective brake unit,
determining, from measured values, a current deceleration caused by the respective estimation braking force,
determining, by taking into account the current deceleration caused by the respective estimation braking force, a determined or specified total mass of the utility vehicle or of the vehicle combination, and a design factor of the respective brake unit, a respective braking characteristic value of the respective brake unit, the design factor representing lever ratios of the one or more respective wheel brakes, the braking characteristic value representing a ratio between a partial braking force of the respective brake unit and a brake pressure which is set for the respective brake unit, and
determining, based on the design factor of the respective brake unit and a dynamic rolling radius thereof, a respective achievable partial braking force that can be achieved by the respective brake unit from the determined respective braking characteristic value; and
estimating, as a sum of respective achievable partial braking forces of the plurality of brake units, the achievable total braking force,
wherein, during each respective estimation braking operation, an application pressure is provided to valve arrangements of brake units different than the respective brake unit for which the respective estimation braking operation is performed, and wherein providing the application pressure to valve arrangements of the different brake units is performed without any braking force being output by any wheel brake of the different brake units.

2. The method as claimed in claim 1, wherein the respective brake units include wheel brakes of individual axles or groups of axles.

3. The method as claimed in claim 1, further comprising aborting the respective estimation braking operation in response to receiving a request for a braking force greater than a previously determined achievable partial braking force for the respective brake unit.

4. The method as claimed in claim 1, wherein the estimation braking operations are carried out and repeated successively for all the plurality of brake units.

5. The method as claimed in claim 1, wherein the wheel brakes are activated pneumatically.

6. The method as claimed in claim 1, wherein the measured values are provided by rotational speed sensors of the wheel brakes.

7. A brake system for the utility vehicle or the vehicle combination, the brake system configured to carry out the method as claimed in claim 1.

8. The brake system as claimed in claim 7, further comprising:
a pneumatic activation system of the wheel brakes.

9. A utility vehicle or vehicle combination, comprising:
a brake system as claimed in claim 7;
the plurality of axles;
the plurality of brake units;
the plurality of wheel brakes; and
a plurality of wheels configured to be braked by the plurality of wheel brakes.

10. A method for estimating achievable total braking force for an automated deceleration of a utility vehicle or of a vehicle combination, the utility vehicle or the vehicle combination having a plurality of axles and a plurality of brake units, the method comprising:

sequentially selecting, until a respective achievable partial braking force has been determined for each respective brake unit of the plurality of brake units, one of the plurality of brake units as an active brake unit and determining, by performing an estimation braking operation for the active brake unit, the respective achievable partial braking force that can be achieved by the active brake unit, wherein the estimation braking operation for the active brake unit comprises:

receiving a requested braking force, setting an application pressure at an activation system of one or more wheel brakes of each of one or more non-active braking units, wherein setting the application pressure at the activation system is performed without any braking force being output by any of the one or more wheel brakes of any of the non-active braking units, applying, by the active brake unit independently of the other brake units, the requested braking force as an estimation braking force, wherein the applying the estimation braking force is performed by applying a corresponding brake pressure at one or more wheel brakes of the active brake unit, and wherein the applying the estimation braking force is performed without any braking force being output by any wheel brake that is not part of the active brake unit, determining, from measured values, a current deceleration caused by the estimation braking force, determining, by taking into account the current deceleration caused by the estimation braking force, a determined or specified total mass of the utility vehicle or of the vehicle combination, and a design factor of the active brake unit, a respective braking characteristic value of the active brake unit, the design factor representing lever ratios of the one or more wheel brakes of the active brake unit, the respective braking characteristic value representing a ratio between a partial braking force of the active brake unit and a partial brake pressure applied at the one or more wheel brakes of the active brake unit, and determining, based on the design factor of the active brake unit and a dynamic rolling radius thereof, the respective achievable partial braking force that can be achieved by the active brake unit from the determined respective braking characteristic value; and estimating the achievable total braking force as a sum of the respective achievable partial braking forces, the achievable total braking force.

11. The method as claimed in claim 10, wherein the requested braking force is received by a brake controller from a brake signal encoder to which a brake pedal is coupled, or wherein the requested braking force is received by the brake controller from a driver assistance system as an external braking force request for automatic deceleration.

12. The method as claimed in claim 11, wherein the brake controller determines the corresponding brake pressure based on the estimation braking force.

13. The method as claimed in claim 11, wherein the brake controller is configured to abort the estimation braking operation in response to the requested braking force increasing above a previously determined achievable partial braking force of the active brake unit.

14. The method as claimed in claim 13, wherein the brake controller is further configured to abort the estimation braking operation in response to a detected wheel slip exceeding a predefined threshold value.

15. The method as claimed in claim 10, wherein at least some of the measured values are provided by an acceleration sensor and/or a rotational speed sensor of a wheel.

16. The method as claimed in claim 10, wherein the braking characteristic value of the active brake unit is determined according to the following equation:

$$C_L = b \times m_{tot} \times r_{dyn}/P \times c_d,$$

wherein $C_L$ is the braking characteristic value of the active brake unit, b denotes the current deceleration, $m_{tot}$ denotes the total mass of the vehicle or of the vehicle combination, $r_{dyn}$ denotes the dynamic rolling radius of the active brake unit, P is the partial brake pressure, and $C_D$ is the design factor of the active brake unit.

17. The method as claimed in claim 16, wherein the respective achievable partial braking force that can be achieved by the nth respective brake unit is determined according to the following equation:

$$F_{B,n} = P \times C_{D,n} \times C_{L,n}/r_{dyn,n}$$

wherein $F_{B,n}$ is the achievable partial braking force that can be achieved by the nth respective brake unit, $C_{D,n}$ denotes the design factor of the nth respective brake unit, $C_{L,n}$ is the braking characteristic value of the nth respective brake unit, and $r_{dyn,n}$ is the dynamic rolling radius of the nth respective brake unit.

\* \* \* \* \*